US012674718B2

(12) United States Patent
Sanders et al.

(10) Patent No.: US 12,674,718 B2
(45) Date of Patent: Jul. 7, 2026

(54) LED WALL SURFACE REFLECTANCE

(71) Applicant: Activision Publishing, Inc., Santa Monica, CA (US)

(72) Inventors: Michael Sanders, San Luis Obispo, CA (US); Xianchun Wu, Culver City, CA (US); Sanjit Patel, Los Angeles, CA (US)

(73) Assignee: Activision Publishing, Inc., Santa Clara, CA (US)

( * ) Notice: Subject to any disclaimer, the term of this patent is extended or adjusted under 35 U.S.C. 154(b) by 237 days.

(21) Appl. No.: 18/397,508

(22) Filed: Dec. 27, 2023

(65) Prior Publication Data

US 2024/0219260 A1     Jul. 4, 2024

Related U.S. Application Data

(60) Provisional application No. 63/477,906, filed on Dec. 30, 2022.

(51) Int. Cl.
*G01M 11/02* (2006.01)
*G01M 11/00* (2006.01)

(52) U.S. Cl.
CPC ...... *G01M 11/0207* (2013.01); *G01M 11/005* (2013.01); *G01M 11/0257* (2013.01)

(58) Field of Classification Search
CPC ........... G01M 11/0207; G01M 11/005; G01M 11/0257; A63F 13/52; A63F 13/60; A63F 13/655; G06V 10/62; G06V 20/653; G06V 2201/12; G06V 40/174; G09G 2300/026; G06F 3/1446; G06F 3/147; G06T 7/90; G06T 13/40; G06T 15/50; G06T 17/20; G06T 19/20; G06T 2219/2021

See application file for complete search history.

(56) References Cited

U.S. PATENT DOCUMENTS

| 5,530,796 A | 6/1996 | Wang |
| 5,561,736 A | 10/1996 | Moore |
| (Continued) | | |

FOREIGN PATENT DOCUMENTS

| AU | 768367 | 3/2004 |
| AU | 2005215048 | 10/2011 |
| (Continued) | | |

*Primary Examiner* — Tarifur R Chowdhury
*Assistant Examiner* — Akbar H. Rizvi
(74) *Attorney, Agent, or Firm* — Novel IP

(57) ABSTRACT

A system for determining surface reflectance of an LED display wall for use in a video game with respect to an object placed before the LED display wall includes a first number of LED sources and a second number of LED sources larger than the first number. The system includes at least one programmatic module for receiving data inputs, which define at least one or more surface area portions of the LED display wall and one or more parameters, a controller coupled with the programmatic module and configured to activate the LED sources in the one or more defined portions of the LED display wall, a camera configured to capture surface reflectance data of the object positioned in front of the LED display wall upon activation or change of the one or more parameters, and a processor configured to process and generate characterizing surface reflectance data.

20 Claims, 4 Drawing Sheets

(56) References Cited

U.S. PATENT DOCUMENTS

| | | | |
|---|---|---|---|
| 5,563,946 A | 10/1996 | Cooper | |
| 5,685,775 A | 11/1997 | Bakoglu | |
| 5,706,507 A | 1/1998 | Schloss | |
| 5,708,764 A | 1/1998 | Borrel | |
| 5,736,985 A | 4/1998 | Lection | |
| 5,737,416 A | 4/1998 | Cooper | |
| 5,745,678 A | 4/1998 | Herzberg | |
| 5,768,511 A | 6/1998 | Galvin | |
| 5,825,877 A | 10/1998 | Dan | |
| 5,835,692 A | 11/1998 | Cragun | |
| 5,878,233 A | 3/1999 | Schloss | |
| 5,883,628 A | 3/1999 | Mullaly | |
| 5,900,879 A | 5/1999 | Berry | |
| 5,903,266 A | 5/1999 | Berstis | |
| 5,903,271 A | 5/1999 | Bardon | |
| 5,911,045 A | 6/1999 | Leyba | |
| 5,920,325 A | 7/1999 | Morgan | |
| 5,923,324 A | 7/1999 | Berry | |
| 5,969,724 A | 10/1999 | Berry | |
| 5,977,979 A | 11/1999 | Clough | |
| 5,990,888 A | 11/1999 | Blades | |
| 6,014,145 A | 1/2000 | Bardon | |
| 6,025,839 A | 2/2000 | Schell | |
| 6,059,842 A | 5/2000 | Dumarot | |
| 6,069,632 A | 5/2000 | Mullaly | |
| 6,081,270 A | 6/2000 | Berry | |
| 6,081,271 A | 6/2000 | Bardon | |
| 6,091,410 A | 7/2000 | Lection | |
| 6,094,196 A | 7/2000 | Berry | |
| 6,098,056 A | 8/2000 | Rusnak | |
| 6,104,406 A | 8/2000 | Berry | |
| 6,111,581 A | 8/2000 | Berry | |
| 6,134,588 A | 10/2000 | Guenthner | |
| 6,144,381 A | 11/2000 | Lection | |
| 6,148,328 A | 11/2000 | Cuomo | |
| 6,185,614 B1 | 2/2001 | Cuomo | |
| 6,201,881 B1 | 3/2001 | Masuda | |
| 6,222,551 B1 | 4/2001 | Schneider | |
| 6,271,842 B1 | 8/2001 | Bardon | |
| 6,271,843 B1 | 8/2001 | Lection | |
| 6,282,547 B1 | 8/2001 | Hirsch | |
| 6,311,206 B1 | 10/2001 | Malkin | |
| 6,334,141 B1 | 12/2001 | Varma | |
| 6,336,134 B1 | 1/2002 | Varma | |
| 6,337,700 B1 | 1/2002 | Kinoe | |
| 6,353,449 B1 | 3/2002 | Gregg | |
| 6,356,297 B1 | 3/2002 | Cheng | |
| 6,411,312 B1 | 6/2002 | Sheppard | |
| 6,426,757 B1 | 7/2002 | Smith | |
| 6,445,389 B1 | 9/2002 | Bossen | |
| 6,452,593 B1 | 9/2002 | Challener | |
| 6,462,760 B1 | 10/2002 | Cox, Jr. | |
| 6,469,712 B1 | 10/2002 | Hilpert, Jr. | |
| 6,473,085 B1 | 10/2002 | Brock | |
| 6,499,053 B1 | 12/2002 | Marquette | |
| 6,505,208 B1 | 1/2003 | Kanevsky | |
| 6,525,731 B1 | 2/2003 | Suits | |
| 6,549,933 B1 | 4/2003 | Barrett | |
| 6,567,109 B1 | 5/2003 | Todd | |
| 6,618,751 B1 | 9/2003 | Challenger | |
| RE38,375 E | 12/2003 | Herzberg | |
| 6,657,617 B2 | 12/2003 | Paolini | |
| 6,657,642 B1 | 12/2003 | Bardon | |
| 6,684,255 B1 | 1/2004 | Martin | |
| 6,717,600 B2 | 4/2004 | Dutta | |
| 6,734,884 B1 | 5/2004 | Berry | |
| 6,765,596 B2 | 7/2004 | Lection | |
| 6,781,607 B1 | 8/2004 | Benham | |
| 6,819,669 B2 | 11/2004 | Rooney | |
| 6,832,239 B1 | 12/2004 | Kraft | |
| 6,836,480 B2 | 12/2004 | Basso | |
| 6,886,026 B1 | 4/2005 | Hanson | |
| 6,948,168 B1 | 9/2005 | Kuprionas | |
| RE38,865 E | 11/2005 | Dumarot | |
| 6,993,596 B2 | 1/2006 | Hinton | |
| 7,028,296 B2 | 4/2006 | Irfan | |
| 7,062,533 B2 | 6/2006 | Brown | |
| 7,143,409 B2 | 11/2006 | Herrero | |
| 7,209,137 B2 | 4/2007 | Brokenshire | |
| 7,230,616 B2 | 6/2007 | Taubin | |
| 7,249,123 B2 | 7/2007 | Elder | |
| 7,263,511 B2 | 8/2007 | Bodin | |
| 7,287,053 B2 | 10/2007 | Bodin | |
| 7,305,438 B2 | 12/2007 | Christensen | |
| 7,308,476 B2 | 12/2007 | Mannaru | |
| 7,404,149 B2 | 7/2008 | Fox | |
| 7,426,538 B2 | 9/2008 | Bodin | |
| 7,427,980 B1 | 9/2008 | Partridge | |
| 7,428,588 B2 | 9/2008 | Berstis | |
| 7,429,987 B2 | 9/2008 | Leah | |
| 7,436,407 B2 | 10/2008 | Doi | |
| 7,439,975 B2 | 10/2008 | Hsu | |
| 7,443,393 B2 | 10/2008 | Shen | |
| 7,447,996 B1 | 11/2008 | Cox | |
| 7,467,181 B2 | 12/2008 | McGowan | |
| 7,475,354 B2 | 1/2009 | Guido | |
| 7,478,127 B2 | 1/2009 | Creamer | |
| 7,484,012 B2 | 1/2009 | Hinton | |
| 7,503,007 B2 | 3/2009 | Goodman | |
| 7,506,264 B2 | 3/2009 | Polan | |
| 7,515,136 B1 | 4/2009 | Kanevsky | |
| 7,525,964 B2 | 4/2009 | Astley | |
| 7,552,177 B2 | 6/2009 | Kessen | |
| 7,565,650 B2 | 7/2009 | Bhogal | |
| 7,571,224 B2 | 8/2009 | Childress | |
| 7,571,389 B2 | 8/2009 | Broussard | |
| 7,580,888 B2 | 8/2009 | Ur | |
| 7,596,596 B2 | 9/2009 | Chen | |
| 7,640,587 B2 | 12/2009 | Fox | |
| 7,667,701 B2 | 2/2010 | Leah | |
| 7,698,656 B2 | 4/2010 | Srivastava | |
| 7,702,784 B2 | 4/2010 | Berstis | |
| 7,714,867 B2 | 5/2010 | Doi | |
| 7,719,532 B2 | 5/2010 | Schardt | |
| 7,719,535 B2 | 5/2010 | Tadokoro | |
| 7,734,691 B2 | 6/2010 | Creamer | |
| 7,737,969 B2 | 6/2010 | Shen | |
| 7,743,095 B2 | 6/2010 | Goldberg | |
| 7,747,679 B2 | 6/2010 | Galvin | |
| 7,765,478 B2 | 7/2010 | Reed | |
| 7,768,514 B2 | 8/2010 | Pagan | |
| 7,773,087 B2 | 8/2010 | Fowler | |
| 7,774,407 B2 | 8/2010 | Daly | |
| 7,782,318 B2 | 8/2010 | Shearer | |
| 7,792,263 B2 | 9/2010 | D Amora | |
| 7,792,801 B2 | 9/2010 | Hamilton, II | |
| 7,796,128 B2 | 9/2010 | Radzikowski | |
| 7,808,500 B2 | 10/2010 | Shearer | |
| 7,814,152 B2 | 10/2010 | McGowan | |
| 7,827,318 B2 | 11/2010 | Hinton | |
| 7,843,471 B2 | 11/2010 | Doan | |
| 7,844,663 B2 | 11/2010 | Boutboul | |
| 7,847,799 B2 | 12/2010 | Taubin | |
| 7,856,469 B2 | 12/2010 | Chen | |
| 7,873,485 B2 | 1/2011 | Castelli | |
| 7,882,222 B2 | 2/2011 | Dolbier | |
| 7,882,243 B2 | 2/2011 | Ivory | |
| 7,884,819 B2 | 2/2011 | Kuesel | |
| 7,886,045 B2 | 2/2011 | Bates | |
| 7,890,623 B2 | 2/2011 | Bates | |
| 7,893,936 B2 | 2/2011 | Shearer | |
| 7,904,829 B2 | 3/2011 | Fox | |
| 7,921,128 B2 | 4/2011 | Hamilton, II | |
| 7,940,265 B2 | 5/2011 | Brown | |
| 7,945,620 B2 | 5/2011 | Bou-Ghannam | |
| 7,945,802 B2 | 5/2011 | Hamilton, II | |
| 7,970,837 B2 | 6/2011 | Lyle | |
| 7,970,840 B2 | 6/2011 | Cannon | |
| 7,985,138 B2 | 7/2011 | Acharya | |
| 7,990,387 B2 | 8/2011 | Hamilton, II | |
| 7,996,164 B2 | 8/2011 | Hamilton, II | |
| 8,001,161 B2 | 8/2011 | George | |
| 8,004,518 B2 | 8/2011 | Fowler | |
| 8,005,025 B2 | 8/2011 | Bodin | |

(56) References Cited

U.S. PATENT DOCUMENTS

| | | |
|---|---|---|
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | Mcvey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 2009/0113448 A1 | 4/2009 | Smith |
| 2014/0344725 A1 | 11/2014 | Bates |
| 2016/0191671 A1 | 6/2016 | Dawson |
| 2017/0064295 A1* | 3/2017 | Stolzberg ................. E04H 3/22 |
| 2020/0286284 A1* | 9/2020 | Grabli ..................... G06T 13/40 |
| 2021/0378076 A1* | 12/2021 | Borra ........................ G06T 7/90 |
| 2024/0259518 A1* | 8/2024 | Yamanishi ............... G06T 5/50 |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |

(56)         References Cited

FOREIGN PATENT DOCUMENTS

| | | |
|---|---|---|
| GB | 2339938 | 10/2002 |
| GB | 2352154 | 7/2003 |
| JP | 3033956 B2 | 4/2000 |
| JP | 3124916 B2 | 1/2001 |
| JP | 3177221 B2 | 6/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| MY | 117864 A | 8/2004 |
| SG | 55396 | 12/1998 |
| WO | 2002073457 | 9/2002 |
| WO | 20020087156 | 10/2002 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

* cited by examiner

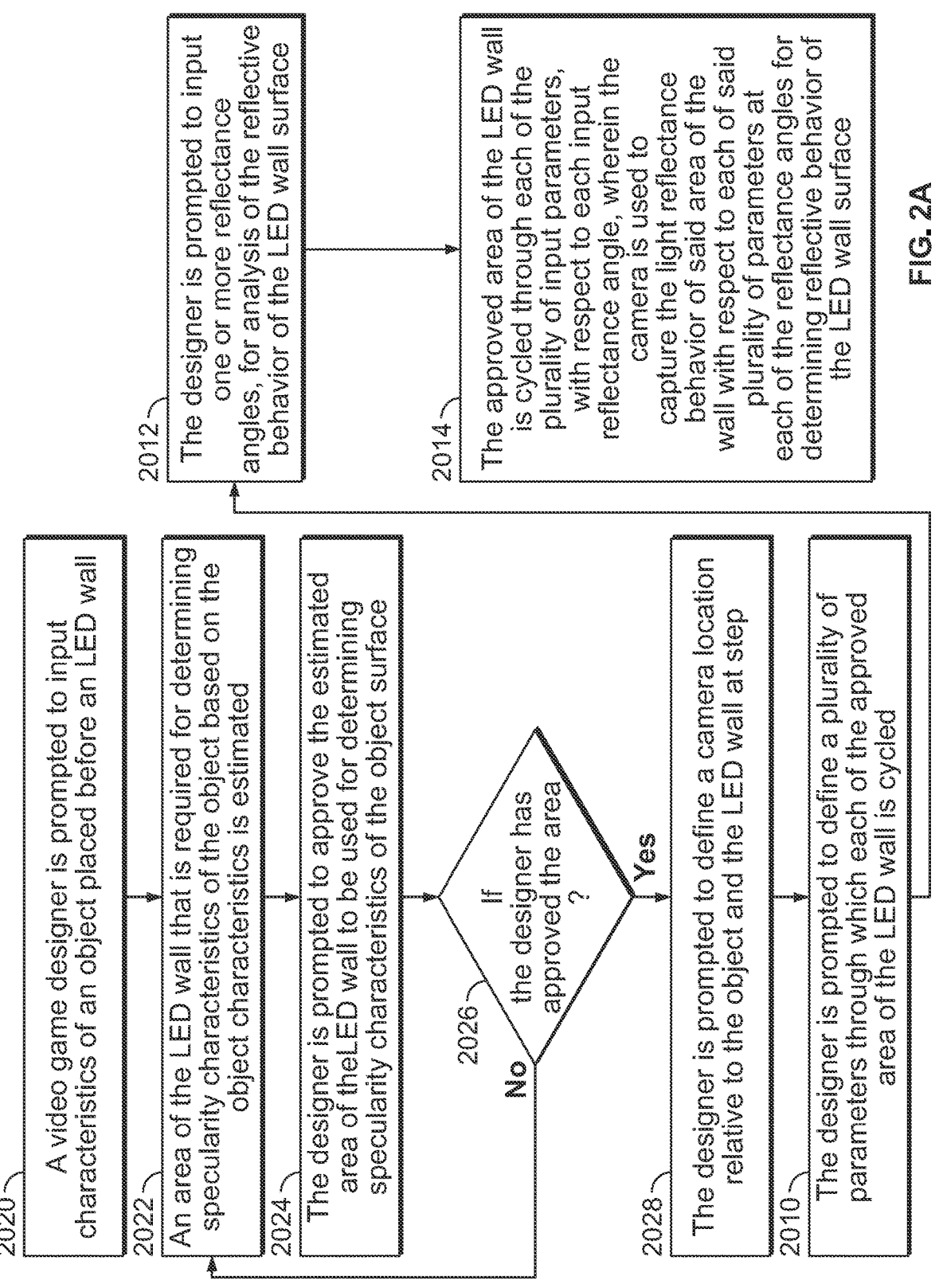

FIG. 2A

2020 — A video game designer is prompted to input characteristics of an object placed before an LED wall 2022 — An area of the LED wall that is required for determining specularity characteristics of the object based on the object characteristics is estimated 2024 — The designer is prompted to approve the estimated area of the LED wall to be used for determining specularity characteristics of the object surface 2026 — If the designer has approved the area?

No / Yes

2028 — The designer is prompted to define a camera location relative to the object and the LED wall at step 2010 — The designer is prompted to define a plurality of parameters through which each of the approved area of the LED wall is cycled 2012 — The designer is prompted to input one or more reflectance angles, for analysis of the reflective behavior of the LED wall surface 2014 — The approved area of the LED wall is cycled through each of the plurality of input parameters, with respect to each input reflectance angle, wherein the camera is used to capture the light reflectance behavior of said area of the wall with respect to each of said plurality of parameters at each of the reflectance angles for determining reflective behavior of the LED wall surface

LED WALL SURFACE REFLECTANCE

CROSS-REFERENCE

The present application relies on U.S. Patent Provisional Application No. 63/477,906, titled "LED Wall Surface Reflectance", and filed on Dec. 30, 2022, for priority, which is herein incorporated by reference in its entirety.

FIELD

The present specification relates generally to a system and method for using room-scale virtual production sets for designing video games. More particularly, the present specification relates to the use of room-scale light emitting diode (LED) walls using subsets of LEDs to selectively collect high resolution surface reflectance data from a variety of surfaces.

BACKGROUND

Motion capture ("mocap") is the process of recording the movement of real objects, such as a human actor, in order to create source data that is used to confirm or map the movement onto a computer graphics animation character or digital avatar of the object within a virtual landscape. A typical motion capture system uses one or more digital cameras to record the movement of the actor while illuminating a number of markers attached at a number of locations on a suit that the actor wears. A digital representation or rendering of the actor in motion is thereafter generated by analyzing the coordinates of the markers in the captured images and mapping them onto a corresponding computer graphics animation character.

Mocap offers advantages over traditional computer animation of a 3D model such as: a) enabling a preview of the spatial representation of the actor's movements in real-time or near real-time and/or b) allowing computer graphics (CG) animation characters to display more realistic and natural movement characteristics.

Filming an actor by using motion capture technique usually involves shooting scenes with the actor in front of a solid color screen, which is usually green in color. The filmed scene may be then dropped onto a required background by digitally removing or "keying out" the solid color. Removing the colored background is also referred to as "chroma keying". When traveling to location for a film is not possible, producers typically rely on chroma-key compositing to create backgrounds, which typically involves layering two images or video streams together based on color hues. A key color or color range is made transparent and then is replaced with content from other film or digital material.

Chroma key compositing is now a well-established technique in the film industry, but there still exist some challenges with its use. In particular, colored light often reflects off the solid-colored screen and "spills" onto the subject, requiring removal during post-production. The color of the screen also generally cannot be used anywhere else in the shot, which places some limits on set and costume designers. Further, because of the limitations in rendering computer graphic content, movements of the camera are often restricted to a dolly track or a few preselected shots for which the content, such as lighting, is already prepared.

The limitations of using the traditional green screen method for motion capture are addressed by using LED walls which are typically large screens made up of light emitting diodes to display video and any other visual content, wherein the screens function similar to computer monitors. Usually, LED walls are formed from multiple panels which, in turn, are fabricated from smaller modules that have multiple multi-color LED's on them. A typical panel size may be 500 mm×500 mm or 19.7 inches×19.7 inches, and usually four such panels are used to form square meter of an LED wall. The LED's are generally surrounded by a black plastic housing. An LED wall may be a curved wall made up of high resolution digital screens where a viewer, if placed in the center and looking toward the LED screens, would be equidistant from all points of the digital screens. In such a case, the LED wall, or combined set of digital screens, cover a 270 degree field of view.

The LED wall creates a virtual set, also known as a volume, which may be used in producing video content. For example, certain television series use a volume made of a giant LED wall that comprises approximately 1,326 individual LED screens of a 2.84-mm pixel pitch, creating a 20-foot tall, 75 feet wide wall of screens defining a 270-degree view, and may further optionally include a LED video ceiling extending over the top of the wall.

The use of LED walls allows for a dynamic filming environment that can automatically adjust to a camera's movement, so that the background appears natural in terms of both positioning and lighting. This ability also negates the problem of light "spill" that must be removed during post-production because all reflected light from the screen matches the desired environment. With the use of LED walls, since no key color is being reserved for removal later, there are no limits on colors for set and costume design. Hence, LED walls provide the ambient lighting for shooting a scene and also provide a high resolution background which changes as the position of the camera changes for the part of the screen which is in the field of view of the camera.

Conventionally, for simulating an environment for designing a video game, a true set of light sources is used for matching the pixels in the game. Usually, a limited set of LED lights in the LED wall are programmed to illuminate an actor in order to quantify how the actor's skin responds to light. The LED wall is used to hyper-sample "true light" on the skin as opposed to a subset of light on the actor's face. In order to understand specularity response of skin to light, multiple different shots of light, such as over 16 light exposures, are captured.

There is need for a system and method for using an LED light stage for creating a realistic background environment that provides more accurate lighting and visual perspectives for actors and game designers. Also needed, is a system and method that eliminates the need for sampling light on skin and allows the use of the LED wall/volume for sampling light in order to determine light specularity.

SUMMARY

The following embodiments and aspects thereof are described and illustrated in conjunction with systems, tools and methods, which are meant to be exemplary and illustrative, and not limiting in scope. The present application discloses numerous embodiments.

The present specification discloses a system for determining surface reflectance of an LED display wall, with respect to an object placed before said LED display wall, wherein the LED display wall comprises a first number of light emitting diode (LED) sources. The system comprising: at least one programmatic module for receiving a plurality of data inputs, wherein the plurality of data inputs define at least one or more surface area portions of the LED display wall and one or more parameters, and wherein the defined one or more surface area portions of the LED display wall comprise a second number of LED sources larger than the first number of LED sources; a controller coupled with the programmatic module and configured to activate the LED sources in the one or more defined surface area portions of the LED display wall; a camera configured to capture data indicative of a surface reflectance of the object positioned in front of the one or more defined surface area portions of the LED display wall upon activation or change of the one or more parameters; and a processor configured to process the data indicative of the surface reflectance in order to generate characterizing surface reflectance data for use in a video game.

In an embodiment, the one or more defined surface area portions of the LED display wall comprise a number of LED sources equal to one LED source per pixel of an image in the video game.

In an embodiment, the controller is configured to move a location of the one or more defined surface area portions of the LED display wall based on the plurality of data inputs, and the camera is configured to move based on the location of the one or more defined surface area portions of the LED display wall.

In an embodiment, the one or more parameters comprise at least one of the LED sources' color, luminance, brightness, exposure, brilliance, highlights, shadows, contrast, black point, saturation, vibrancy, warmth, tint, sharpness, and definition.

In an embodiment, the plurality of data inputs further comprises values defining one or more contexts, wherein the one or more contexts comprise at least one of a nighttime, cloudy day, rainy day, snowfall, thunderstorms, fluorescent light, moon shadows, sunset or sunrise.

In an embodiment, when executed, the one or more programmatic modules generates a graphical user interface (GUI) configured to receive at least one of object characteristics, parameters, camera location, context or reflectance angle, wherein, the object characteristics comprise a size of the object, a shape of the object and a distance of the object from the LED display wall.

In an embodiment, the LED display wall is at least 60 feet wide and 18 feet tall.

In an embodiment, the camera is configured to capture a predefined number of data points indicative of a surface reflectance of the object positioned in front of the one or more defined surface area portions of the LED display wall.

In some embodiments, the present specification provides a method for determining surface reflectance of an LED wall with respect to an object placed before the LED wall, the method comprising: receiving one or more characteristics of the object; estimating a first area of the LED wall required for determining specularity characteristics of the object based on the received object characteristics; receiving a camera location relative to the object and the LED wall; receiving one or more parameters of the LED wall; receiving one or more reflectance angles; using the camera to capture light reflectance data of the first area of the LED wall with respect to each of the received one or more parameters at each of the received one or more reflectance angles; and analyzing the captured data to obtain light reflectance behavior of the LED wall.

In an embodiment, the object characteristics comprise a size of the object, a shape of the object and a distance of the object from the LED wall.

In an embodiment, the method further comprises prompting a user to approve the estimated first area; and estimating a second area of the LED wall required for determining specularity characteristics of the object based on the received object characteristics, if an approval for the estimated first area is not received from the user.

In an embodiment, the one or more parameters of the LED wall comprise color, luminance, brightness, exposure, brilliance, highlights, shadows, contrast, black point, saturation, vibrancy, warmth, tint, sharpness, and definition.

In an embodiment, the method further comprises receiving one or more contexts related to a scene being shot by using the LED wall; wherein the received contexts comprise one or more of: nighttime, cloudy day, rainy day, snowfall, thunderstorms, fluorescent light, moon shadows, or sunset/sunrise.

In an embodiment, a graphical user interface (GUI) is used to receive at least one of the one or more object characteristics, the one or more parameters, the camera location, or the one or more reflectance angle.

In an embodiment, the LED wall is at least 60 feet wide and 18 feet tall.

In an embodiment, the method further comprises moving the camera based on the location of the estimated first area of the LED wall.

The aforementioned and other embodiments of the present specification shall be described in greater depth in the drawings and detailed description provided below.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 2A is a flowchart illustrating the steps of determining surface reflectance of an LED volume, in accordance with embodiments of the present specification.

DETAILED DESCRIPTION

Figure 1A:
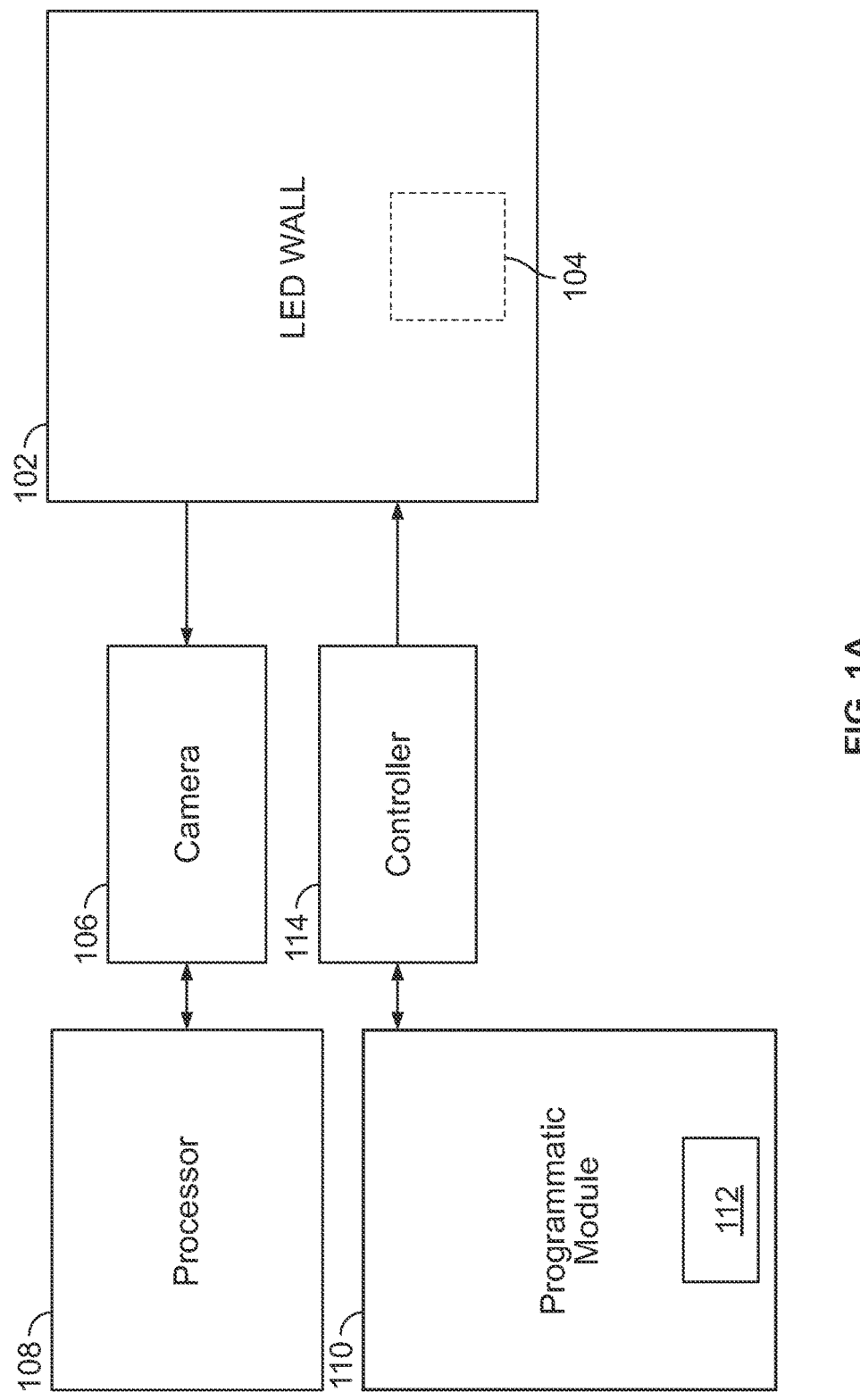
FIG. 1A is a block diagram illustrating a system for determining surface reflectance of an LED volume, in accordance with an embodiment of the present specification.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The term "module" used in this disclosure may refer to computer logic utilized to provide a desired functionality, service or operation by programming or controlling a general purpose processor. Stated differently, in some embodiments, a module implements a plurality of instructions or programmatic code to cause a general purpose processor to perform one or more functions. In various embodiments, a module can be implemented in hardware, firmware, software or any combination thereof. The module may be interchangeably used with unit, logic, logical block, component, or circuit, for example. The module may be the minimum unit, or part thereof, which performs one or more particular functions.

In various embodiments, a "computing device" includes an input/output controller, at least one communications interface and system memory. In various embodiments, the computing device includes conventional computer components such as a processor, necessary non-transient memory or storage devices such as a RAM (Random Access Memory) and disk drives, monitor or display and one or more user input devices such as a keyboard and a mouse. In embodiments, the user input devices allow a user to select objects, icons, and text that appear on the display via a command such as a click of a button on a mouse or keyboard or alternatively by touch in embodiments where the display is a touch-enabled screen. The computing device may also include software that enables wireless or wired communications over a network such as the HTTP, TCP/IP, and RTP/RTSP protocols. These elements are in communication with a central processing unit (CPU) to enable operation of the computing device. In various embodiments, the computing device may be a conventional standalone computer, a mobile phone, a tablet or a laptop. In some embodiments, the functions of the computing device may be distributed across multiple computer systems and architectures.

In some embodiments, execution of a plurality of sequences of programmatic instructions or code enables or causes the CPU of the computing device to perform various functions and processes. In alternate embodiments, hard-wired circuitry may be used in place of, or in combination with, software instructions for implementation of the processes of systems and methods described in this application. Thus, the systems and methods described are not limited to any specific combination of hardware and software.

In various embodiments, a motion capture system of the present specification includes at least one processor capable of processing programmatic instructions, has a memory capable of storing programmatic instructions, and employs software comprising a plurality of programmatic instructions for performing the processes described herein. In embodiments, a computer-readable non-transitory medium comprises the plurality of executable programmatic instructions. In one embodiment, the at least one processor is a computing device capable of receiving, executing, and transmitting a plurality of programmatic instructions stored on a volatile or non-volatile computer readable medium.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items, or meant to be limited to only the listed item or items. It should be noted herein that any feature or component described in association with a specific embodiment may be used and implemented with any other embodiment unless clearly indicated otherwise.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred, systems and methods are now described.

As used herein, the term actor refers to a human person, who is the subject of a motion capture system, wears clothing having markers attached at various locations to enable digital cameras to record the being's movement, and/or is expected to move as guided by the motion capture movement system of the present specification.

Motion capture uses motion-tracking cameras to capture the movement of an actor or object wearing motion tracking markers. The data is communicated to a computer equipped with motion capture software. The software creates a virtual skeleton by using the motion capture data that moves with the actor in real-time. As the actor performs, the director and the production team may watch a preliminary animated version of the actor's performance. Once the desired performance has been achieved, the character is animated over the skeleton in post-production or real-time.

In various embodiments, the present specification provides methods of capturing the offset of a motion capture actor in front of a display wall projection system, such as but not limited to, an LED wall, whereby the actor's background is moved relative to the actor's movement. In an embodiment, the present specification provides a method for providing background imagery for different gaming levels in which an actor is required to perform, controlling the background imagery, such as sand dunes, forests, a village, etc., by tracking the actor's head so that as the actor moves through different gaming levels, the background imagery changes accordingly.

In an embodiment, the computed offset is used by a computing engine to intelligently place gaming elements (such as, but not limited to, a tanker or an explosion) at a desired distance, position, and angle relative to the actor. Offset data positions an animation post production in order to align actor to scenery. It should be appreciated, therefore, that computing engine changes, moves, aligns, or otherwise modifies the background imagery, displayed on the LED wall, in relation to the mocap data being received and/or as a function of the offset value.

In embodiments, a processor receives signals from a front signal transmitter plate and a back signal transmitter plate of a helmet worn by mocap actors positioned before an LED wall via three back plate render nodes and a front plate render node coupled with the processor. In embodiments, each of the three back plate render nodes provide signals corresponding to a predefined section of the LED wall based on an output resolution of a graphics processing unit (GPU) of the processor and a pixel density of the LED wall. For example, if the pixel resolution of the LED wall is 8K×4K, four GPU outputs having a pixel resolution of 4K×2K would be required in order to obtain a full wall resolution. In embodiments, the front plate render node provides signals corresponding to an alpha object that overrides the video image of the mocap actors simulating an instance where a computer generated (CG) object is placed in front of the actors that is rendered as a foreground object. In some embodiments, multiple render nodes may be multiplexed for out-of-phase graphics interleaving with the LED wall representing different perspectives at the same time.

Conventionally, for simulating an environment for designing a video game, a true set of light sources is used for matching the pixels in the game. Usually, a limited set of LED lights in the LED wall are programmed to illuminate an actor in order to quantify how the actor's skin responds to light. The LED wall is used to hyper-sample "truelight" on the skin as opposed to a subset of light on the actor's face. In order to understand specularity response of skin to light, multiple different shots of light, such as over 16 light exposures are captured in approximately 1.5 seconds.

Embodiments of the present specification provide an LED light stage for creating a realistic background environment that provides more accurate lighting and visual perspectives for actors and game designers. In an embodiment, the present specification provides a system and method for using the LED wall/volume for efficiently modeling the reflectance of light on any set of surfaces in order to determine light specularity. In embodiments, the actor is photographed/recorded in the LED wall environment and the imagery is manipulated to extract various texture maps. For example, the LED wall may be used to send light data from different directions, and the corresponding images that are recorded may be decomposed by using specialized software programs in order to generate the texture maps (normal/bump/roughness/albedo/etc.), similar to the manner in which bidirectional reflectance distribution function (BRDF) models are calculated using light and camera to obtain images of a material from different angles. In an embodiment, a beam-split camera array may be used to record the polarized and unpolarized light reflectance on an actor positioned before the LED wall, and the recorded images may be simultaneously extracted to obtain a specular map.

In an embodiment, an LED wall of the present specification comprises a display wall at least 60 feet wide and 18 feet tall. In an embodiment, a predefined number of LEDs on the LED wall are replaced with a second larger number of LEDs. In embodiments, this is accomplished by replacing a first board or display of LEDs, comprising a portion of the LED wall, with a second board or display of LEDs, wherein the second board or display of LEDs has the same dimensions as the first board or display of LEDs and a larger number of LEDs relative to the first board or display of LEDs, such that the second board or display of LEDs has a denser distribution of LEDs relative to the first board or display of LEDs. In an embodiment, a board comprising 18-20 LEDs is replaced with a predefined larger number of LEDs, ranging from less than 1 to 5 LED light sources per pixel of a generated video game image for sampling light. The predefined larger number of LEDs are then synchronized with a camera for capturing a video which is used to determine the reflective behavior of the LED wall surface.

In embodiments, the present specification provides a system and method for an optimized use of the LED wall to collect surface reflectance data. The captured surface reflectance data is processed to generate characterizing surface reflectance data for video games. FIG. 1 is a block diagram illustrating a system 100 for determining surface reflectance of an LED volume or wall 102 comprising LED sources, in accordance with an embodiment of the present specification. A subset 104 of the LED wall 102, which may be located at any plurality of locations on the LED wall 102, is used to cycle through a predefined number of lighting parameters to examine and evaluate surface specularity. The system 100 further comprises: a programmatic module 110 having a program 112 configured to receive data inputs (regarding how the LED sources should be activated); a controller 114 configured to activate the LED sources based on the data inputs; a camera 106 configured to capture the reflectance data; and, a processor 108 configured to generate characterizing surface reflectance data for use in a video game.

The camera 106 is used to capture a video of the subset of LEDs 104, at each location on the LED wall, at different levels of luminance of the subset of LEDs 104. Each location of the subset of LEDs 104 on the LED wall 102 enables the camera 106 to capture surface reflectance at a different reflectance angle. The processor 108 coupled with the camera 106 is programmed to synchronize the capture of video by the camera 106 with the activation or change of one or more parameters, such as, but not limited to luminance, color, position, and intensity of light emitted by the subset of LEDs 104 on the LED wall 102 to obtain a predefined number of reflectance data points for analyzing the reflective behavior of the LED wall surface. In various embodiments, the number of reflectance data points required for analyzing the reflective behavior of the LED wall surface is dependent on the resolution of the camera 106 being used, which ranges from approximately 12 to 50 megapixels, and the texture resolution required in game, which in some embodiments ranges from 4K to 16K.

In embodiments, different areas of LED wall 102 emit a plurality of color/intensity of light representing different reflectance angles of light projecting toward the actor, similar to the manner in which bidirectional reflectance distribution function (BRDF) models are calculated. In embodiments, the processor 108 sends a network/UDP/electronic signal which is triggered in software, to the camera 106 via wired/wireless communication, in order to synchronize the camera 106 with changes in parameters of the subset of LEDs 104 on the LED wall 102.

In an embodiment, the subset of LEDS 104 comprises one LED per pixel for covering an actor's face from ear to ear which encompasses 180 degrees. Due to an increase in the number of LEDs, a larger density of lights rays travel to the actor relative to the camera resolution. Further, lumen value of the denser pixels provide enough light to support a predefined depth of field to obtain a desired sensor integration time.

In embodiments, actor reflectance capture is achieved using a subset of lights, for obtaining a natively full resolution of color/pixel/ray projections across the actor as opposed to false upsampling of hundreds/thousands of point lights. In embodiments, the LED wall is used as a comparative for ray casting, so that each pixel-to-ray in the render of the character (corresponding to the actor) is at the same sample density of the LED wall.

Figure 1B:
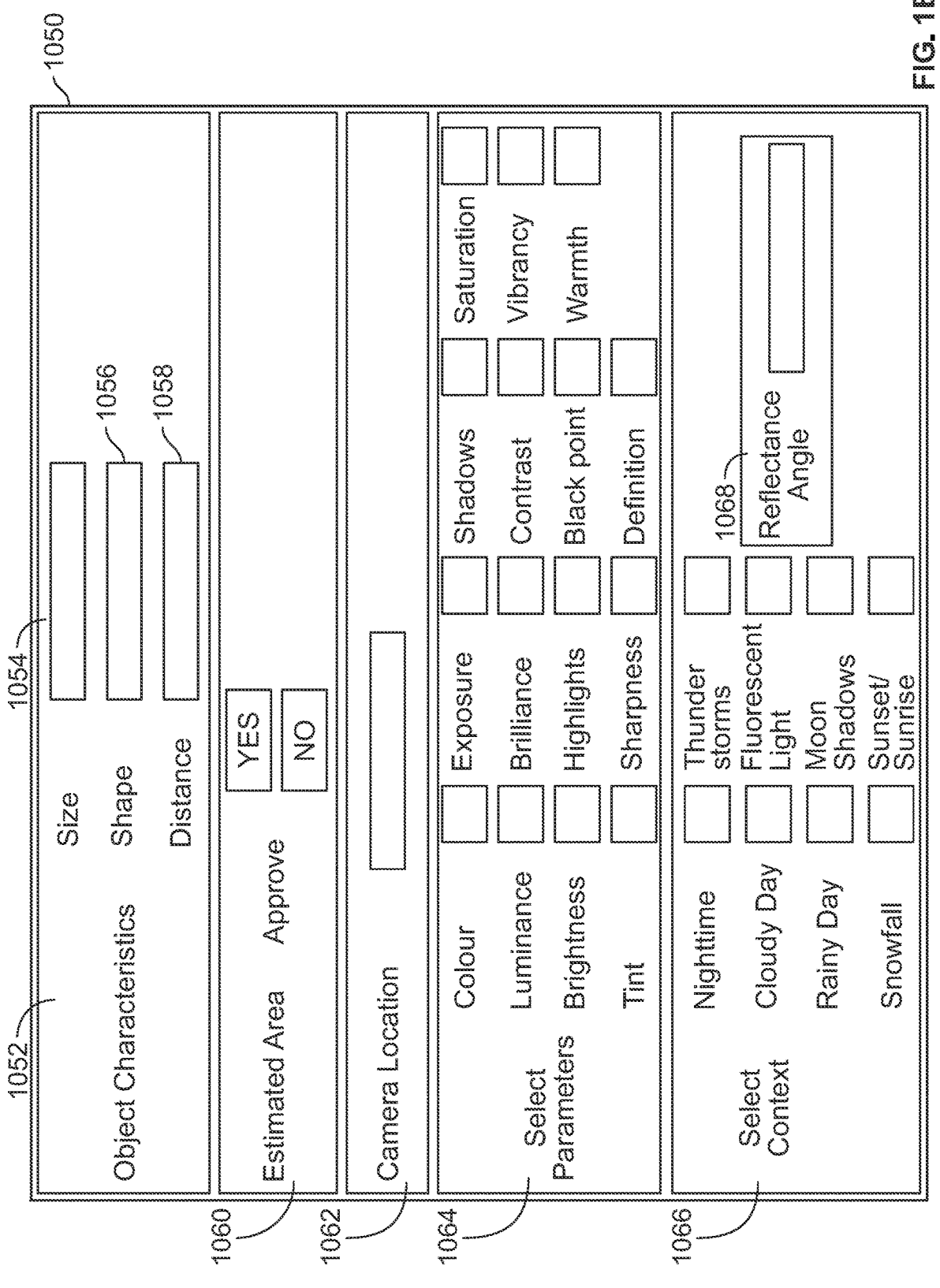
FIG. 1B illustrates an exemplary GUI enabling a video game designer to define parameters for generating reflectance data, in accordance with an embodiment of the present specification.

FIG. 1B illustrates an exemplary GUI enabling a video game designer to define parameters for generating reflectance data, in accordance with an embodiment of the present specification. GUI 1050 enables a video game designer to enter data defining parameters for characterizing specularity of objects placed before an LED wall. In embodiments, as described above, the LED wall emits a plurality of color/intensity of light representing different reflectance angles of light projecting toward the object, and imagery of the object is recorded under differing conditions, after which, various software techniques/algorithms are used to analyze the imagery and generate render maps for mapping the object onto a corresponding computer graphics animation.

GUI 1050 comprises an input control 1052 for prompting the designer to input object characteristics. In embodiments, predefined object characteristics, such as, but not limited to size, shape and distance from the LED wall may be entered in input controls 1054, 1056, and 1058 respectively. In an embodiment, the method of the present specification estimates an area of the LED wall that is required for determining specularity characteristics of the object based on the size, shape and distance of the object from the LED wall.

Input control 1060 prompts the designer to approve the estimated area of the of the LED wall to be used for determining specularity characteristics of the object surface. Input control 1062 prompts the designer to define a camera location relative to the object and the wall. In embodiments, the camera perspective is required to be well-defined and the camera location is defined such that the camera captures the specularity characteristics of the object. The approved area of the LED wall is cycled through a plurality of parameters, wherein a camera is used to capture the light reflectance behavior of said area of the wall with respect to each of said plurality of parameters. In embodiments, the approved area of the LED wall comprises densely packed LED sources, wherein the number of LED sources in the approved area is larger than the number of LED sources in the remaining area of the LED wall. Input control 1064 prompts the designer to define a plurality of parameters through which each of the approved area of the LED wall is cycled. In embodiments, the designer may input parameters such as, but not limited to, color, luminance, brightness, exposure, brilliance, highlights, shadows, contrast, black point, saturation, vibrancy, warmth, tint, sharpness, and definition, via the control 1064. For example, when the approved area of the LED wall is cycled through the luminance parameter, surface reflectance data is collected from the approved area of the LED wall at all the predefined varying luminance levels at predefined reflectance angles.

In an embodiment, the designer may input one or more contexts via an input control 1066, wherein a value of each context lies in a predefined range of each parameter associated therewith. Non-limiting examples of the contexts that may be input by the designer include nighttime, cloudy day, rainy day, snowfall, thunderstorms, fluorescent light, moon shadows, and sunset/sunrise. In an embodiment, the designer is prompted to input one or more reflectance angles via an input control 1068, for analysis of the reflective behavior of the LED wall surface.

FIG. 2A is a flowchart illustrating the steps of determining surface reflectance of an LED volume, in accordance with embodiments of the present specification. At step 2020 a video game designer is prompted to input characteristics of an object placed before an LED wall. In embodiments, predefined object characteristics, such as, but not limited to size, shape and distance from the LED wall may be entered. At step 2022, an area of the LED wall that is required for determining specularity characteristics of the object based on the object characteristics is estimated. In embodiments, the estimated area of the LED wall is relative to one or more of: a size of the object placed before an LED wall; a size of lighting/environment of the LED wall being used; complexity of information required to be extracted; and a size/location/coverage of recording camera being used. For example, in case of the object being a perfect grey sphere, approximately six locations of the same intensity in the LED wall may be illuminated for recording the reflectance of the sphere, and a known algorithm may be used for extracting the corresponding maps for mapping the object onto a corresponding computer graphics animation, since the nature of the object is predictable and does not need large sampling. On the contrary, in cases where the object placed before the LED wall is a human face having more features/angles/details, a larger number of reflectance parameters and hence, a larger number of estimated areas of the LED wall would be required to obtain enough render maps for obtaining specularity characteristics of the object.

At step 2024 the designer is prompted to approve the estimated area of the of the LED wall to be used for determining specularity characteristics of the object surface. At step 2026 it is determined if the designer has approved the area. If the designer does not approve the area, steps 2022 and 2026 are repeated and a new area is estimated for approval. If the designer approves the estimated area, the designer is prompted to define a camera location relative to the object and the LED wall at step 2028. At step 2010, the designer is prompted to define a plurality of parameters through which each of the approved area of the LED wall is cycled. In embodiments, the designer may input parameters such as, but not limited to, color, luminance, brightness, exposure, brilliance, highlights, shadows, contrast, black point, saturation, vibrancy, warmth, tint, sharpness, and definition. At step 2012, the designer is prompted to input one or more reflectance angles, for analysis of the reflective behavior of the LED wall surface. In an embodiment the designer is prompted to input one or more contexts, wherein a value of each context lies in a predefined range of each parameter associated therewith. Non-limiting examples of the contexts that may be input by the designer include nighttime, cloudy day, rainy day, snowfall, thunderstorms, fluorescent light, moon shadows, and sunset/sunrise. At step 2014, the approved area of the LED wall is cycled through each of the plurality of input parameters, with respect to each input reflectance angle, wherein the camera is used to capture the light reflectance behavior of said area of the wall with respect to each of said plurality of parameters at each of the reflectance angles.

Figure 2B:
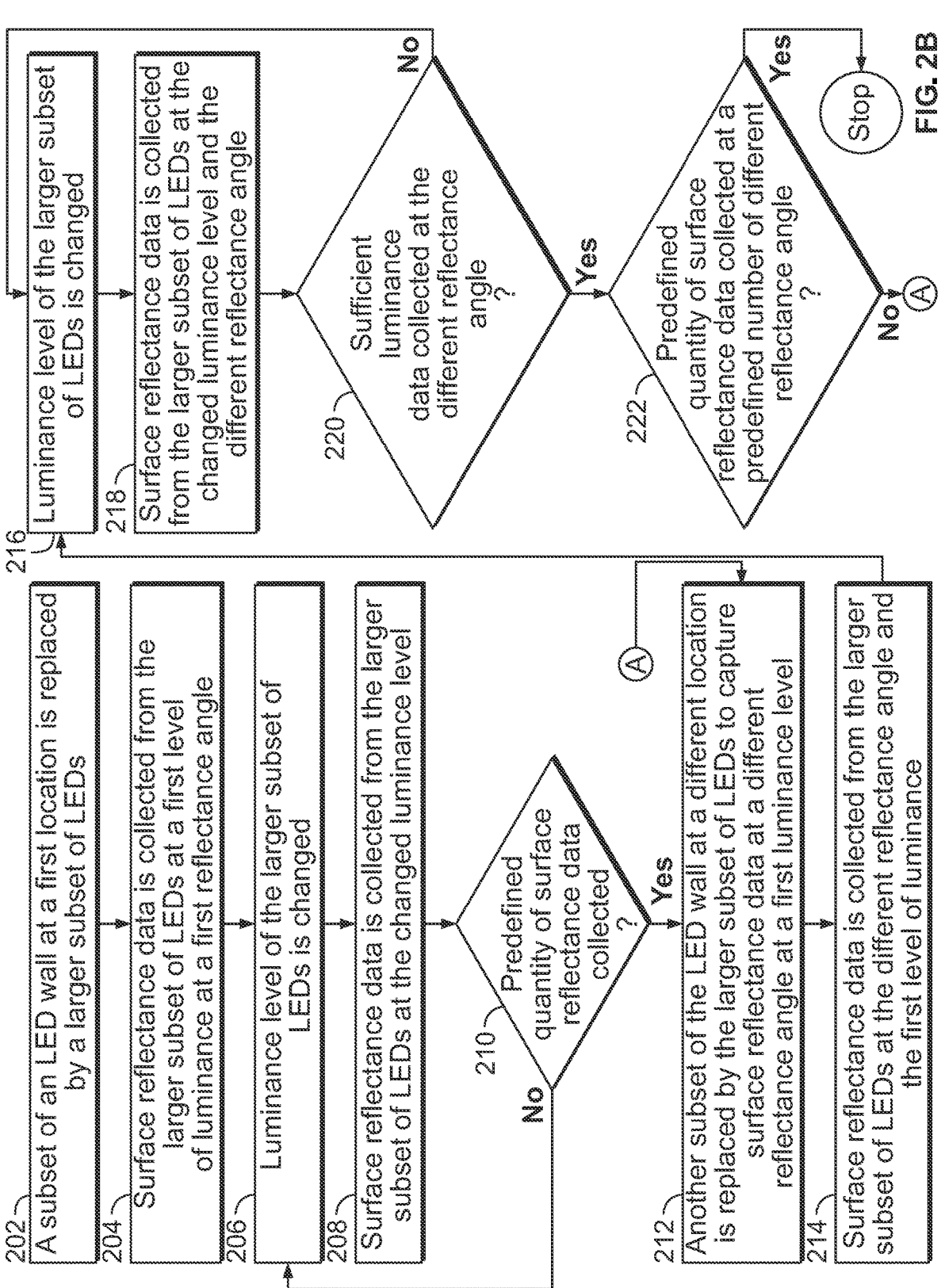
FIG. 2B is a flowchart illustrating the steps of determining surface reflectance of an LED volume by cycling through different values of a luminance parameter for multiple reflectance angles, in accordance with an embodiment of the present specification.

FIG. 2B is a flowchart illustrating the steps of determining surface reflectance of an LED volume by cycling through different values of a luminance parameter for multiple reflectance angles, in accordance with an embodiment of the present specification. At step 202, a subset of an LED wall at a first location is replaced by a larger subset of LEDs. At step 204, surface reflectance data is collected from the larger subset of LEDs at a first level of luminance at a first reflectance angle.

At step 206, luminance level of the larger subset of LEDs is changed. At step 208, surface reflectance data is collected from the subset of LEDs at the changed luminance level. At step 210, it is determined if a predefined quantity of surface reflectance data has been collected.

In an embodiment, 16 different images of an object placed before the LED wall are obtained from 20 cameras having a resolution of 50 megapixel each, while varying illumination conditions, polarity, intensity, position, and color of light for each of the 16 times. The obtained images are combined and analyzed using a known algorithm in order to generate enough render maps for obtaining specularity characteristics of the object. In another embodiment, a video having 60 frames per second is recorded from 40 cameras having a resolution ranging from 2 megapixels to 25 megapixels to obtain grey scale data that can be used as a secondary data input for obtaining specularity characteristics of the object placed before the LED wall. All recorded data contributes towards generating a three-/four-dimensional reconstruction of the object to provide information about how the obtained render maps apply to the shape or changing shape of the object.

If a predefined quantity of surface reflectance data has not been collected, steps 206 to 210 are repeated. If a predefined quantity of surface reflectance data has been collected, then at step 212, another subset of the LED wall at a different location is replaced by the larger subset of LEDs to capture surface reflectance data at a different reflectance angle at a first luminance level. In an embodiment, an object placed before the LED wall is illuminated from 300 different locations on the LED wall over an angle of 360 degrees. In embodiments the number of reflectance angles at which data is collected at each luminesce level depends upon the sensitivity of the recording device, dynamic range and the safe level of illumination from the LED wall. For example, if the resolution of the LED wall is 16K×8K pixels, the object may be illuminated per pixel of the wall depending upon the pixel intensity of the wall and the sensitivity of the camera, to record 128,000,000 bytes of surface reflectance data.

At step 214, surface reflectance data is collected from the larger subset of LEDs at the different reflectance angle and the first level of luminance. At step 216, luminance level of the larger subset of LEDs is changed. At step 218, surface reflectance data is collected from the larger subset of LEDs at the changed luminance level and the different reflectance angle.

At step 220 it is determined if a predefined quantity of surface reflectance data is collected at the different reflectance angle. If a predefined quantity of surface reflectance data has not been collected at the different reflectance angle, steps 216 to 220 are repeated. At step 222, it is determined if a predefined quantity of surface reflectance data has been collected at a predefined number of different reflectance angles. If a predefined quantity of surface reflectance data has not been collected at a predefined number of different reflectance angles, steps 212 to 222 are repeated. If a predefined quantity of surface reflectance data has been collected at a predefined number of different reflectance angles, the collection of surface reflectance data is stopped. In an embodiment, a camera coupled with a processor is used to capture a video of the subset of LEDs at each location on the LED wall, at different levels of luminance of the subset of LEDs. The processor is programmed to synchronize the capture of video by the camera with the activation or change of luminance of the subset of LEDs.

In an embodiment, an image decomposition algorithm is used to collect parameters such as, but not limited to, light and image acquisition from different angles and with different intensities, different polarization and color for analyzing surface reflectance properties of the LED wall.

In an embodiment, algorithms known to persons of ordinary skill in the art are used to analyze surface reflectance properties of the LED wall. In an embodiment, any algorithm used for determining bidirectional reflectance distribution function (BRDF) models may be used. The algorithms use surface normal (a 90 degree vector from the surface, for each pixel) as illuminating angles that are used to collect the desired reflectance data. In cases where the normal angle relative to the camera position is sharper than a predefined value, the surface value is disregarded, and a subsequent camera angle with a tighter normal angle is used to compute the surface reflectance value. In embodiments, the number of reflectance data points collected is dependent upon a number of cameras being used as well and a distance of baseline separation.

In an embodiment, a digital representation or rendering of an object placed before the LED wall is evaluated against the real object by using a "turntable" technique. Typically, in VFX scenarios, a computer generated (CG) object is rendered using a light probe from a real-world location. The object is subsequently rotated in a render of that light in order to evaluate the appearance of the light on the object for gauging realism. The method used in the present specification does not require rotating the object. Instead, in embodiments, images of the object are captured under "one light at a time". Then, each of the light sources is simulated in the video game engine by turning on the light source to obtain a frame by frame render of the digital object. The rendered digital object is then evaluated against real photographs of the object placed before the LED wall and the differential between the two images is applied to either the lighting environment in the video game or the texture maps of the object to fine tune the realism in a feedback loop.

In embodiments, a digital representation or rendering of the actor in motion is generated by analyzing the coordinates of the markers in the captured images and mapping them onto a corresponding computer graphics animation character. In an embodiment, the rendering involves "cheats" or "shortcuts" such as, but not limited to moving the actor's skin subsurface scattering to produce a two-dimensional screen effect in a video game. In an embodiment, the LED wall may be used to project a video game environment on an actor for capturing images of the actor using at least one camera, in order to obtain a digital representation/rendering of the actor in the environment by analyzing the coordinates of the actor's markers in the captured images. In order to compensate for any "cheats" used during the rendering, differences between the actor and the obtained digital representation (character) of the actor are analyzed. The differences are inverted into the render or the asset and/or the actor is recaptured and the differences between the actor and the obtained character are re-analyzed, after which the differences are added to character maps and level rendering in order to obtain a required match of the generated character with the actor.

The above examples are merely illustrative of the many applications of the system and method of the present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

What is claimed is:

1. A system for determining surface reflectance of an LED display wall, with respect to an object placed before said LED display wall, wherein the LED display wall comprises a first number of light emitting diode (LED) sources, the system comprising:

at least one programmatic module configured to receive a plurality of data inputs defining at least one target illumination zone comprising one or more contiguous surface area portions of the LED display wall, wherein each of the defined one or more contiguous surface area portions of the LED display wall comprise a grouping of more than one of the first number of LED sources;

a controller coupled with the programmatic module and configured to activate the LED sources in the defined at least one target illumination zone according to one or more calibration parameters, wherein the one or more calibration parameters comprises at least one of color, luminance, and exposure;

a camera configured to capture data indicative of reflected light intensity and spectral distribution from the object positioned in front of the at least one target illumination zone during activation; and a processor configured to process the captured data to generate calibrated surface reflectance data for the object and to store the calibrated surface reflectance data as reflectance profile data adapted to be implemented in a video game.

2. The system of claim 1, wherein the at least one target illumination zone of the LED display wall comprises a number of LED sources equal to one LED source per pixel of an image in the video game.

3. The system of claim 1, wherein the controller is configured to move a location of the at least one target illumination zone of the LED display wall based on the plurality of data inputs.

4. The system of claim 3, wherein the camera is configured to move based on the location of the at least one target illumination zone of the LED display wall.

5. The system of claim 1, wherein the one or more parameters further comprise at least one of the LED sources' brightness, brilliance, highlights, shadows, contrast, black point, saturation, vibrancy, warmth, tint, sharpness, and definition.

6. The system of claim 1, wherein the plurality of data inputs further comprises values defining one or more contexts, wherein the one or more contexts comprise at least one of a nighttime, cloudy day, rainy day, snowfall, thunderstorms, fluorescent light, moon shadows, sunset and sunrise.

7. The system of claim 1, wherein the at least one programmatic module is configured to generate a graphical user interface (GUI) configured to receive at least one of object characteristics, parameters, camera location, context and reflectance angle.

8. The system of claim 7, wherein, the object characteristics comprise a size of the object, a shape of the object and a distance of the object from the LED display wall.

9. The system of claim 1, wherein the LED display wall is at least 60 feet wide and 18 feet tall.

10. The system of claim 1, wherein the camera is configured to capture a predefined number of data points indicative of reflected light intensity and spectral distribution from the object positioned in front of the at least one target illumination zone of the LED display wall.

11. A method for determining surface reflectance of an LED wall with respect to an object placed before the LED wall, wherein the LED display wall comprises a first number of light emitting diode (LED) sources, the method comprising:

receiving a plurality of data inputs defining at least one target illumination zone comprising, one or more contiguous surface area portions of the LED display wall, wherein each of the defined one or more contiguous surface area portions of the LED display wall comprise a grouping of more than one of the first number of LED sources;

activating the LED sources in the defined at least one target illumination zone according to one or more calibration parameters, wherein the one or more calibration parameters comprises at least one of color, luminance, and exposure;

using a camera to capture data indicative of reflected light intensity and spectral distribution from the object positioned in front of the at least one target illumination zone during activation; and analyzing the captured data to generate calibrated surface reflectance data for the object and to store the calibrated surface reflectance data as reflectance profile data adapted to be implemented in a video game.

12. The method of claim 11, wherein the object characteristics comprise a size of the object, a shape of the object and a distance of the object from the LED wall.

13. The method of claim 11, further comprising prompting a user to approve the defined target illumination zone.

14. The method of claim 11, further comprising moving a location of the at least one target illumination zone of the LED display wall based on the plurality of data inputs.

15. The method of claim 11, wherein the one or more parameters of the LED wall further comprise at least one of the LED sources' brightness, brilliance, highlights, shadows, contrast, black point, saturation, vibrancy, warmth, tint, sharpness, and definition.

16. The method of claim 11, using the camera comprises capturing a predefined number of data points indicative of reflected light intensity and spectral distribution from the object positioned in front of the at least one target illumination zone of the LED display wall.

17. The method of claim 11, wherein the plurality of data inputs further comprises values defining one or more contexts, wherein the one or more contexts comprise at least one of a nighttime, cloudy day, rainy day, snowfall, thunderstorms, fluorescent light, moon shadows, and sunset/sunrise.

18. The method of claim 11, wherein a graphical user interface (GUI) is used to receive at least one of the one or more object characteristics, the one or more parameters, the camera location, and the one or more reflectance angles.

19. The method of claim 11, wherein the LED wall is at least 60 feet wide and 18 feet tall.

20. The method of claim 11, further comprising moving the camera based on the location of the at least one target illumination zone of the LED wall.

* * * * *